United States Patent [19]

Belt et al.

[11] 4,454,590

[45] Jun. 12, 1984

[54] PROGRAMMABLE SIGNAL PROCESSING DEVICE

[75] Inventors: Ronald A. Belt, Plymouth, Minn.; Guy D. Couturier, Beavercreek, Ohio

[73] Assignee: The United States of America as represented by the Secretary of the Air Force, Washington, D.C.

[21] Appl. No.: 315,599

[22] Filed: Oct. 30, 1981

[51] Int. Cl.³ .............................................. G06F 15/31
[52] U.S. Cl. ..................................................... 364/724
[58] Field of Search ............... 364/735, 580, 581, 724, 364/725

[56] References Cited

U.S. PATENT DOCUMENTS

| | | | |
|---|---|---|---|
| 3,914,588 | 10/1975 | Nussbaumer | 364/724 |
| 4,132,989 | 1/1979 | Arens | 345/5 CM |
| 4,146,931 | 3/1979 | Delforge | 364/724 |
| 4,218,752 | 8/1980 | Hewes et al. | 364/825 |

FOREIGN PATENT DOCUMENTS 2095067 9/1982 United Kingdom ................ 364/724

OTHER PUBLICATIONS

H. J. DeMan et al., "High Speed NMOS Circuits for ROM-Accumulator and Multiplier Type Digital Filter", IEEE Journal Solid State Circuits, vol. SC-13, (Oct. 1978), p. 565.

C. S. Burrus, "Digital Filter Structures Described by Distributed Arithmetic", IEEE Transactions on Circuits and Systems, vol. CAS-24, (Dec. 1977), pp. 674-680.

T. F. Cheek, W. L. Eversole, J. F. Salzman, "Programmable Image Processing Element", Avionics Laboratory, Air Force Wright Aeronautical Labs., Report AFWAL-TR-80-1209.

IBM Technical Disclosure Bulletin, vol. 17, No. 9, Feb. 1975, Digital Filter, M. Tubania, pp. 2656-2658.

IEEE Proc., vol. 128, Pte., No. 3, May 1981, Speed Optimized Microprocessor Implementation of a Digital Filter, B. S. Tan & G. J. Hawkins, pp. 85-94.

Primary Examiner—David H. Malzahn
Assistant Examiner—Oleg Schatoff
Attorney, Agent, or Firm—Donald J. Singer; Bernard E. Franz

[57] ABSTRACT

The device performs the function $$\sum_{i=1}^{M} W_i X_i$$

for image processing, where $W_i$ are fixed weights for any specific application. It uses a PROM and accumulator algorithm, in which the memory stores the values $$\sum_{i=1}^{M} W_i B_i$$

in $2^M$ words, with addresses formed from one bit of each data word in a given bit position. In operation the most significant bit of each data word is used first to address memory, and in successive clock cycles the other bit positions are used down to the least significant. The memory output words are supplied to the adder-accumulator, and in each clock cycle the adder-accumulator output is shifted left one bit and used as a second input thereof. Then if the data words have N bits designated $j=0$ to $N-1$, after N clock cycles the memory output words have each been effectively multiplied by $2^j$ and accumulated in the sum.

9 Claims, 2 Drawing Figures

4,454,590

PROGRAMMABLE SIGNAL PROCESSING DEVICE

RIGHTS OF THE GOVERNMENT

The invention described herein may be manufactured and used by or for the Government of the United States for all governmental purposes without the payment of any royalty.

BACKGROUND OF THE INVENTION

This invention relates to a programmable signal processing device using a read only memory and an accumulator with shifting to form a sum of products.

Rapid advances have been made during the past several years in large-scale integrated circuit (LSIC) technology. These advances have had a significant impact on many signal processing functions in such applications as forward looking infrared (FLIR) radar, guidance and control, and electronic counter measures (ECM) systems. In particular, image processing system studies for video bandwidth reduction, FLIR automatic cueing, 3-D target classification, and image understanding have consistently recommended using LSIC technologies to perform critical image processing functions. A general purpose algorithm (see W. K. Pratt, *Digital Image Processing*, Wiley-Interscience, New York, 1978) which uses the linear operation $$Y = \sum_{i}^{M} W_i X_i$$

on a single video line or on a square block of picture elements is a candidate to be implemented with LSIC technologies.

While such algorithms can be executed easily at low data rates using general purpose mini-computers or even commercial microprocessors, it is usually not possible to execute them in real time in an airborne environment because of excessive size, weight, power dissipation, and cost. The key to effective system design is to apply LSIC technology to minimize the overall component count and variety of components while absorbing as much as possible of the control and timing logic onto the information processing chips themselves. The solution is optimum when the same chips can be used for a multitude of other applications to provide a high volume market. These requirements have lead to the desire for a programmable chip architecture, and in turn, to the concept of a parallel/serial input bus.

A read-only memory (ROM)—accumulate algorithm has been discovered and applied to digital filter structures. This has been discussed in various places, including H. J. DeMan et al in a paper entitled "High Speed NMOS Circuits for ROM Accumulator and Multiplier-type Digital Filters," Proceedings ISSCC (San Francisco, Feb. 17, 1978) p 200, 1; and IEEE Journal Solid-State Circuits, Vol. SC-13 (October 1978), pp 565–572. see also C. S. Burrus, "Digital Filter Structures Described by Distributed Arithmetic," IEEE Transactions on Circuits and Systems, Vol. CAS-24 (December 1977), pp 674–680. The algorithm makes use of the fact that each multiplication involves a fixed coefficient or weighting factor and a variable data factor. The multiply operations are precalculated and stored in the ROM, for individual bit positions of the data.

SUMMARY OF THE INVENTION

The object of the invention is to provide a general purpose digital device which can be programmed to perform a variety of signal processing functions such as cosine and Hadamard transforms, edge extraction, unsharp masking, pole-zero filtering, and signal smoothing on data blocks at high data rates.

Another object is to provide such a device without excessive size, weight, power dissipation, or cost.

The device according to the invention comprises data input registers including parallel to serial registers, a programmable read-out memory, and accumulator-shift circuits arranged to calculate $$Y = \sum_{i}^{M} W_i X_i$$

in which the sum of products $$\sum_{i}^{M} W_i B_{ij}$$

are stored in the memory with $2^M$ words. The memory addresses comprise M binary digits (bits), one from each data word in position j, starting with the most (or least) significant bit. The memory output is supplied to an adder, whose output is shifted left (or right) one position and supplied as a second input of the adder. The result is that after the memory is addressed for all j bit positions of the data words, the memory outputs for position j have been multiplied by $2^j$, for positions (j−1) by $2^{j-1}$, down to $2^0$ for the least significant position, and the sum has been accumulated.

DETAILED DESCRIPTION

The programmable signal processing device can perform any mathematical operation of the form:

$$Y = \sum_{i=1}^{M} W_i X_i$$

where $X_i$ are data inputs, $W_i$ are weighting coefficients, and M is the number of data inputs. In a preferred embodiment the $X_i$ have 1 to 6 bits accuracy, the $W_i$ have 1 to 8 bits accuracy, and M varies from 1 to 9.

The operations are performed entirely in the digital mode with no restrictions on the values of the weighting coefficients. The device is configured for a specific application by programming of the memory and by the clocking, control and input-output connection logic. The programming makes use of a unique algorithm approach in which no multiplies are used whatsoever, with the result that the throughput is limited primarily by the add cycle time and the number of bits accuracy utilized for the input data (i.e., not by the number of terms M in the summation expression).

Figure 1:
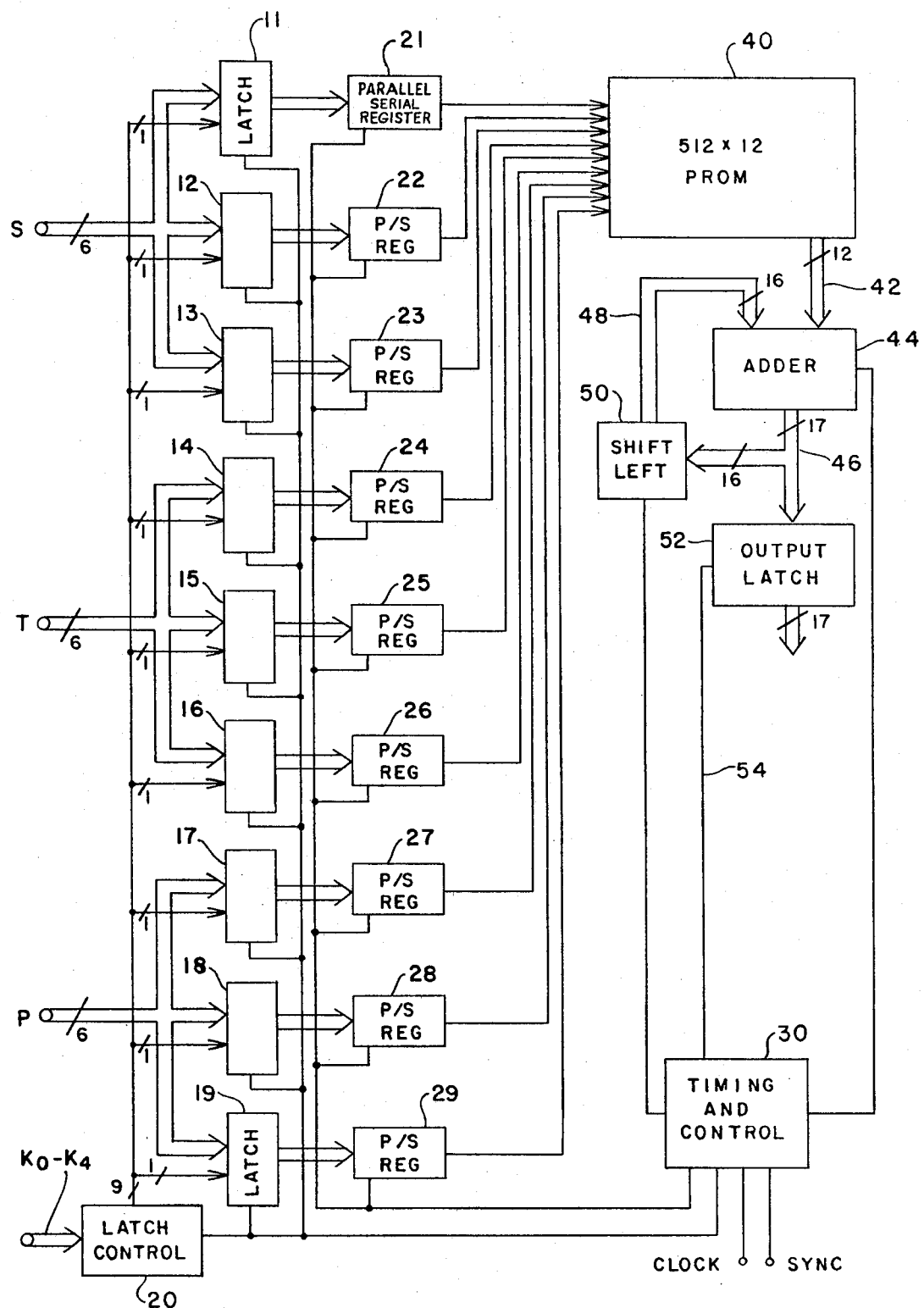
FIG. 1 is a block diagram of a programmable signal processing device.

A block diagram of the preferred embodiment is shown in FIG. 1. This block diagram along with a discussion of the algorithm for programming the memory and operation of the device was supplied by applicants herein to a contractor (contract No. F33615-79-C-1763) who designed a large-scale integrated circuit chip to implement the block diagram. The final contract report AFWAL-TR-80-1209 dated November 1980, government accession No. AD-A100852, is attached hereto as an appendix, and is incorporated herein by reference. It is available from National Technical Information Service (NTIS).

The input section of FIG. 1 comprises nine sets of latches 11-19 for loading up to nine data words $X_1$ to $X_9$, and nine parallel-to-serial registers 21-29. In order to accommodate both word-serial and word-parallel data inputs (e.g., for an $8 \times 1$ transform as well as a $3 \times 3$ window operation), an addressing scheme is used which permits loading up to three words simultaneously using three separate input ports and their associated three separate input buses S, T and P. Alternatively, up to nine words can be loaded sequentially into the same input latches by tieing together the input pins from all three inputs to form a common input bus, and then applying the proper address sequence. The input buses S, T and P, the latches 11-19, the registers 21-29, and the lines between them, all provide conductors and devices for six bits in parallel. The latch control circuit 20 receives the data addresses on five leads $K_0$-$K_4$ and supplies them to selected one of the nine leads connected individually to the latches 11-19. The parallel-to-serial registers 21-29 are static or dynamic components which can be implemented using either a parallel load/serially-clocked shift register approach, a multiplexer approach, or a variable length shift register approach. All parallel-to-serial registers are clocked in common and initiated at one time.

The memory 40 is a programmable read-only memory having 512 words of twelve bits each. The address is supplied from the parallel-to-serial registers 21-29. Each address comprises one bit of each data word, starting with the most significant bit.

The output from the memory is supplied on twelve leads 42 to a parallel adder/accumulator 44 (leads for bits 12-17 at the left are connected together at this input). A second input to the adder is supplied on a set of sixteen leads 48 from a shift left circuit 50, which provides a one-bit shift after each add operation. The output of the adder is supplied on seventeen leads 46 to an output latch 52, and on sixteen of these leads 46 to the shift left circuit. Timing and control circuits 30 supplies the required timing and control signals to the various units.

Once the memory has been properly programmed, the chip operation is effected by (1) loading the input data, (2) clocking the device for a fixed number of clock periods, and (3) hitting the output enable line 54 to obtain the desired output.

As an alternative embodiment, the memory addresses may be formed starting with the least significant bits of the data words, and the shift left circuit 50 replaced by a shift right circuit.

PRINCIPLES OF OPERATION AND PROGRAMMING

It is desired to calculate $$Y = \sum_{i=1}^{M} W_i X_i \quad \quad 1)$$

where the weights $W_i$ are fixed and known a priori, and where the inputs $X_i$ are variable. In binary arithmetic one can represent the $X_i$ by $$X_i = \sum_{j=0}^{N} B_{ij} 2^j \quad \quad 2)$$

where the $B_{ij}$ are the binary values in each "digit" place, i.e., $$B_{ij} \epsilon \{0,1\}$$

Substituting equation (2) into equation (1) gives $$Y = \sum_{i=1}^{M} W_i \sum_{j=0}^{N} B_{ij} 2^j \quad \quad 3)$$

$$= \sum_{j=0}^{N} \sum_{i=1}^{M} W_i B_{ij} 2^j$$

$$= \sum_{j=0}^{N} \delta Y_j 2^j$$

where $$\delta Y_j = \sum_{i=1}^{M} W_i B_{ij} \quad \quad 4)$$

Some reflection on equation (4) will show that $\delta Y_j$ has only $2^M$ possible values. Therefore, since the $W_i$ are known, a priori, and since the $B_{ij}$ are either zero or one, it is possible to precompute the $\delta Y_j$ in equation (4) for all possible combinations of $B_{ij}$, store them in the memory, and then use the particular $B_{ij}$ from the incoming data to address the memory and obtain the $\delta Y_j$ values which correspond to it. Once the particular values of $\delta Y_j$ are obtained, equation (3) is used to compute the final value of Y. Equation (3) merely involves shifting the $\delta Y_j$'s by one bit position before adding to the previous sum.

The size of the memory required for this techique is $2^M$ words, where M is the maximum number of terms in equation (1), i.e., the maximum number of input words to be filtered. The number of bits per word in the memory is given by word length of $\delta Y_j$ = word length of $W_i$ = log$_2$M.

To help clarify the above discussion, it is convenient to assume small size words and the number thereof. Let us assume M=4, i.e., (i=1 to 4), N=2, i.e., (j=0 to 2), and $W_i$ length of 4 bits. The expansion of equation (2) gives $X_1 = 4B_{12} + 2B_{11} + B_{10}$
$X_2 = 4B_{22} + 2B_{21} + B_{20}$
$X_3 = 4B_{32} + 2B_{31} + B_{30}$
$X_4 = 4B_{42} + 2B_{31} + B_{30}$ Expansion of equation (4) gives $\delta Y_0 = W_4 B_{40} + W_3 B_{30} + W_2 B_{20} + W_1 B_{10}$
$\delta Y_1 = W_4 B_{41} + W_3 B_{31} + W_2 B_{21} + W_1 B_{11}$
$\delta Y_2 = W_4 B_{42} + W_3 B_{32} + W_2 B_{22} + W_1 B_{12}$ and by equation (3)

$Y = 4\delta Y_2 + 2\delta Y_1 + \delta Y_0$

It is clear that the possible values of $\delta Y_j$ is independent of the particular value of j, and that for M=4 there are sixteen different values to be stored in memory. The four bits of the memory address may be used in any order as long as the use is consistent and the appropriate value of $W_i$ is used with each bit for calculating the memory contents. Let's use the order $B_4B_3B_2B_1$. Then the memory words have the values $W_4B_4+W_3B_3+W_2B_2+W_1B_1$.

EXAMPLE 1

As a specific example, let $W_4=5$, $W_3=30$, $W_2=17$, $W_1=2$. Then the contents of the memory are as shown in Table A.

TABLE A

| Address | Contents | |
|---|---|---|
| | Decimal | Binary |
| 0000 | 0 | 000 0000 |
| 0001 | 2 | 000 0010 |
| 0010 | 17 | 001 0001 |
| 0011 | 19 | 001 0011 |
| 0100 | 30 | 001 1110 |
| 0101 | 32 | 010 0000 |
| 0110 | 47 | 010 1111 |
| 0111 | 49 | 011 0001 |
| 1000 | 5 | 000 0101 |
| 1001 | 7 | 000 0111 |
| 1010 | 22 | 000 1110 |
| 1011 | 24 | 001 1000 |
| 1100 | 35 | 010 0011 |
| 1101 | 37 | 010 0101 |
| 1110 | 52 | 011 0100 |
| 1111 | 54 | 011 0110 |

To show the operation with one specific set of input data, assume

| | Decimal | Binary | MSB on right |
|---|---|---|---|
| $X_4$ | 6 | 110 | 011 |
| $X_3$ | 5 | 101 | 101 |
| $X_2$ | 1 | 001 | 100 |
| $X_1$ | 4 | 100 | 001 |

The most significant bits of the data words are used first in forming the memory addresses. In this example the addresses and contents are as follows:

| Bit position | Address | Contents |
|---|---|---|
| $j^2$ | 1101 | 010 0101 |
| $j^1$ | 1000 | 000 0101 |
| $j^0$ | 0110 | 010 1111 |

The outputs of the memory, the adder, and the shift left circuit are then as follows:

| Address | | |
|---|---|---|
| 1101 | shift | 0000 0000 |
| | memory | 010 0101 |
| | adder | 0 0010 0101 |
| 1000 | shift | 0100 1010 |
| | memory | 000 0101 |
| | adder | 0 0100 1111 |
| 0110 | shift | 1001 1110 |
| | memory | 010 1111 |
| | adder | 0 1100 1101 |

The last value from the adder is the output, which has a decimal value of 205. The decimal calculation using equation (1) is as follows:

$$W_4X_4 = 5 \times 6 = 30$$

$$W_3X_3 = 30 \times 5 = 150$$
$$W_2X_2 = 17 \times 1 = 17$$
$$W_1X_1 = 2 \times 4 = \underline{8}$$
$$\text{Sum } 205$$

Thus, when the summation in equation (4) is performed to full precision, there is no truncation or roundoff in the final answer. I.e., the result is exact. However, the device of FIG. 1 may be operated with some truncation or roundoff if desired, for some applications.

Specific Embodiment

As a specific embodiment, assume a memory and registers with the sizes shown in FIG. 1. Also assume that the memory is to be programmed for a Hadamard transform. The inputs are supplied in the $3\times 3$ format, with the center position blank as follows:

| | | |
|---|---|---|
| a | b | c |
| h | | d |
| g | f | e |

The weighting coefficients may be calculated with a simple FORTRAN program as follows:

```
      ISCALE=2**10
      WRITE (7,2)
  2   FORMAT(1X,37HINPUT A,B,C,D,E,F,G,H FORMAT
      1X,F6.3)
      READ (5,3) A,B,C,D,E,F,G,H,
  3   FORMAT (8(1X,F6.3))
      DO 100 IX="O, "377
      YY=A*(IX.AND."1)+B*(IX.AND. "2)/2.+
      C*(IX.AND."4)/4.
      YY=YY+D*(IX.AND. "10)/8.+E*(IX.AND. "20)/16.
      YY=YY+F*(IX.AND."40)/32.
      Y=YY+G*(IX.AND."100)/64.+H*(IX.AND. "200)/128.
      IY=IFIX(Y*ISCALE)
      WRITE (6,1)IX,IY,Y
  1   FORMAT(1X,03,5X,06,5X,F6.3)
 100  CONTINUE
      END
      *
```

The scale factor of $2^{10}$ is used because the weight coefficients have fractional values in the form of a decimal point followed by three decimal digits, which requires ten binary digits. The scale factor permits the conversion to integer form. Assume that the assigned weights are

| | | |
|---|---|---|
| $W_1 = .245$ | $W_4 = .049$ | $W_7 = -.208$ |
| $W_2 = .208$ | $W_5 = -.049$ | $W_8 = -.245$ |
| $W_3 = .139$ | $W_6 = -.139$ | |

Then the memory content for a few of the 512 addresses is as shown in Table B.

TABLE B

| Address | Contents |
|---|---|
| 0000 0000 | 0000 0000 0000 |
| 0001 1100 | 1111 0111 0010 |
| 0001 1111 | 1111 0100 1100 |
| 1110 0000 | 0010 0101 1110 |
| 1111 1111 | 0001 1010 1001 |

EXAMPLE 2

To show a sample calculation, assume data input as follows:

|   |   |   |   |    |    |    |
|---|---|---|---|----|----|----|
| a | b | c |   | 38 | 38 | 38 |
| h |   | d | = | 48 | 38 | 49 |
| g | f | e |   | 48 | 49 | 49 |

This is loaded as follows:

|   | Data Input | Registers 21-14 28, MSB on right |
|---|------------|----------------------------------|
| a | 100110 | 011001 |
| b | 100110 | 011001 |
| c | 100110 | 011001 |
| d | 110001 | 100011 |
| e | 110001 | 100011 |
| f | 110001 | 100011 |
| g | 110000 | 000011 |
| h | 110000 | 000011 |

The outputs of the memory, the adder, and the shift left circuit are then shown below. Note that when the MSB (the sign bit) from memory is a 1, then all bits to the left thereof become 1's at the adder input.

| Address | | |
|---------|---|---|
| 1111 1111 | Shift  | 0000 0000 0000 0000 |
|           | memory | 0001 1010 1001 |
|           | adder  | 0 0000 0001 1010 1001 |
| 0001 1111 | shift  | 0000 0011 0101 0010 |
|           | memory | 1111 0100 1100 |
|           | adder  | 0 0000 0010 1001 1110 |
| 0000 0000 | shift  | 0000 0101 0011 1100 |
|           | memory | 0000 0000 0000 |
|           | adder  | 0 0000 0101 0011 1100 |
| 1110 0000 | shift  | 0000 1010 0111 1000 |
|           | memory | 0010 0101 1110 |
|           | adder  | 0 0000 1100 1101 0110 |
| 1110 0000 | shift  | 0001 1001 1010 1100 |
|           | memory | 0010 0101 1110 |
|           | adder  | 0 0001 1100 0000 1010 |
| 0001 1100 | shift  | 0011 1000 0001 0100 |
|           | memory | 1111 0111 0010 |
|           | adder  | 0 0011 0111 1000 0110 |

The output is then divided by the scale factor of $2^{10}$. This is because the weights stored in memory were multiplied by $2^{10}$ to eliminate the factoring in both the memory and the adder accumulator. The result is 000 1101.1110 0001 10 which is 13.881 base 10.

The calculation using equation (1) in decimal form is $$Y = .245(38) + .208(38) + .139(38) + .049(49)$$
$$-.049(49) - .139(49) + .208(48) - .245*48)$$

$$= \begin{matrix} 9.31 & + & 7.904 & + & 5.282 & + & 2.401 \\ -2.401 & - & 6.811 & + & 9.984 & - & 11.76 \end{matrix}$$

$$+ 13.909$$

which is a % error=0.2 due to truncation of the weights in memory.

Matrix Operation

The device of FIG. 1 is ideally suited for matrix operations of the form.

$$Y = [W_0\ W_1\ W_2\ W_3\ W_4\ W_5\ W_6\ W_7\ W_8] \begin{bmatrix} X_0 \\ X_1 \\ X_2 \\ X_3 \\ X_4 \\ X_5 \\ X_6 \\ X_7 \\ X_8 \end{bmatrix} \quad (5)$$

Where Y represents the product of a row vector, W, and a column vector, X. Most signal-processing applications require the product of a weighting matrix and an input vector. This can be represented by $$Y = WX \quad (6)$$

or, for the device as $$\begin{bmatrix} Y_0 \\ Y_1 \\ Y_2 \\ Y_3 \\ Y_4 \\ Y_5 \\ Y_6 \\ Y_7 \\ Y_8 \end{bmatrix} = \begin{bmatrix} W_{00}\ W_{01}\ W_{02}\ldots W_{08} \\ W_{10}\ W_{11}\ W_{12}\ldots W_{18} \\ \cdot \\ \cdot \\ \cdot \\ \cdot \\ \cdot \\ \cdot \\ W_{80}\ W_{81}\ W_{82}\ldots W_{88} \end{bmatrix} \begin{bmatrix} X_0 \\ X_1 \\ X_2 \\ X_3 \\ X_4 \\ X_5 \\ X_6 \\ X_7 \\ X_8 \end{bmatrix}$$

Figure 2:
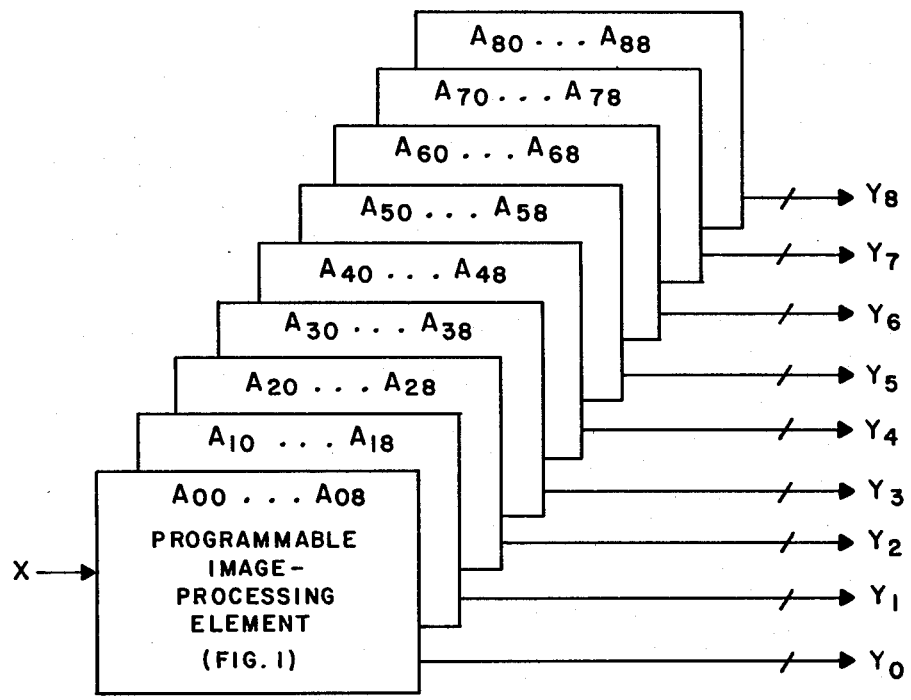
FIG. 2 is a diagram showing nine of the devices of FIG. 1 connected to receive the same input data, for matrix calculations.

A diagram of the device configured to implement Equation (6) is shown in FIG. 2. Nine chip devices of FIG. 1 are used, with each programmed with the weighting coefficients of one row of W. This eliminates reprogramming, thus increasing the speed of the calculation. All the inputs are connected and data is entered sequentially. Nine sample periods are required to load the devices. The Y vector is calculated in parallel for the particular values of X. A valid output is available every sample period if operating on sliding 9-by-1 data while nine sample periods are required to produce an answer if the operation of Equation (6) is performed on nonsliding 9-by-1 data blocks.

Thus, while preferred constructional features of the invention are embodied in the structure illustrated herein, it is to be understood that changes and variations may be made by the skilled in the art without departing from the spirit and scope of my invention.

We claim:

1. A signal processing system comprising a signal processing device for calculating $$\sum_{i=1}^{M} W_i X_i,$$

said device comprising:
a read-only memory which is programmed to store the sum of products $$\sum_{i=1}^{M} W_i B_i$$

in $2^M$ words, where $B_i$ have binary values of 0 or 1 and $W_i$ are weighting coefficients for a given application, the memory addresses being the $2^M$ different sets of $B_i$ for words of M bits;

input means comprising $M_m$ first registers, each of which provides storage for a word of N bits, input bus means having at least one input bus with parallel conductors for N bit positions coupled via input gate means to the first registers, input address means connected to control the input gate means to enter M words of data $X_i$ from the input bus means into corresponding input registers, M for a given application having a positive integer value equal to or less than $M_m$, $M_m$ parallel-to-serial registers coupled via transfer gate means to the first registers, control means which includes means for controlling transfer of the data words from the first register via the transfer gate means to the parallel-to-serial registers;

memory address means for said memory coupled to the parallel-to-serial registers to form addresses with one bit from each parallel-to-serial register in a given bit position;

output means including an adder-accumulator and a shift circuit, the adder-accumulator having a first input from the output of said memory and a second input from the shift circuit, and a connection from the adder-accumulator output to the shift circuit input;

said control means including timing means for providing successive clock cycles; the device being operative, after the data words are loaded into the parallel-to-serial registers and the shift circuit is cleared, during each clock cycle to use an address from the memory address means and supply the memory word at that address to the first input of the adder-accumulator and add it to the word from the shift circuit, and then in the shift circuit to shift the resulting word from the adder-accumulator one bit, so that after N clock cycles each word output from memory has been effectively multiplied by $2^j$ and accumulated in the sum.

2. The device as set forth in claim 1, wherein said ready-only memory is erasable and programmable, and said control means has changeable parameters, so that the device may be adapted for a specific application wherein the value of M and the weighting coefficients are fixed.

3. The device as set forth in claim 2, wherein $M_m$ equals nine, and said input bus means comprises three buses of N bit conductors each, the input address means being adapted to enter data words from all three buses at the same time, with up to three words in sequence on each bus, or alternatively to enter the M data words in sequence from one bus, depending on the specific application.

4. The device as set forth in claim 3, wherein the 512 memory words have twelve bits each to accommodate weighting coefficients of eight bits, and wherein the output means includes an output latch coupled to the output of the adder-accumulator.

5. The device as set forth in claim 4, wherein N equals 6, the shift circuit provides for words of 16 bits, and the output from the adder-accumulator to the output latch provides for words of 17 bits.

6. A signal processing system comprising a plurality of the devices as set forth in claim 1, 3, or 5, with the input bus means connected in common to supply the devices with the same data words, the devices being programmed with different weighting coefficients.

7. The device as set forth in claim 1, 2, 3 or 4, wherein said shift circuit is a shift left circuit, the memory address being formed first from the most significant bits with $j=(N-1)$ of the data words, and then in successive clock cycles from the succeeding bits $j=(N-2)$ etc bits until the least significant bits are reached with $j=0$.

8. The device as set forth in claim 1, 2, 3 or 4 wherein said device is incorporated on one large scale integrated circuit chip.

9. A signal processing system comprising a plurality of the devices as set forth in claim 8, with the input bus means connected in common to supply the devices with the same data words, the devices being programmed with different weighting coefficients.

* * * * *